United States Patent [19]

Grimmonpre

[11] Patent Number: 5,026,089

[45] Date of Patent: Jun. 25, 1991

[54] LUGGAGE SECURING STRAP FOR USE WITH COLLAPSIBLE LUGGAGE CARRIER

[76] Inventor: Gerald D. Grimmonpre, 6310 W. Round Up Rd., McHenry, Ill. 60050

[21] Appl. No.: 412,659

[22] Filed: Sep. 26, 1989

[51] Int. Cl.$^5$ .............................................. B62B 1/06
[52] U.S. Cl. ................................ 280/655; 280/47.29; 24/306
[58] Field of Search ..................... 280/304.5, 655, 654, 280/47.29, 47.24, 47.27, 47.18; 24/306, 200, 601.2, 601.4

[56] References Cited

U.S. PATENT DOCUMENTS

| | | | |
|---|---|---|---|
| 3,892,429 | 7/1975 | dit Dalmey | 280/654 |
| 3,947,054 | 3/1976 | Hall | 280/47.29 |
| 3,998,476 | 12/1976 | Kazmark, Sr. | 280/655 |
| 4,175,769 | 11/1979 | Kazmark | 280/654 |
| 4,221,402 | 9/1980 | Kazmark | 280/655 |
| 4,401,319 | 8/1983 | Kazmark | 280/655 |
| 4,431,211 | 2/1984 | Carrigan | 280/655 |
| 4,506,897 | 3/1985 | Libit | 280/655 |
| 4,546,995 | 10/1985 | Kassai | 280/655 |
| 4,630,837 | 12/1988 | Kazmark | 280/655 |

Primary Examiner—Andres Kashnikow
Assistant Examiner—Richard Camby
Attorney, Agent, or Firm—Jon Carl Gealow

[57] ABSTRACT

A strap for securing luggage to a collapsible luggage cart, the length of which is preliminarily adjusted with a buckle for securing particular pieces of luggage to the cart, and which may thereafter be used to secure the same pieces of luggage to the cart without further adjustment of the length of the strap by the buckle. The strap, which is formed of a flat web material is provided with a buckle at one end, a hook fastener provided with a slot for receiving the strap is place on a loop of the strap formed by the buckle, and spaced segment of mutually engageable material are provided on one side of the strap at the other end.

4 Claims, 2 Drawing Sheets

U.S. Patent    June 25, 1991    Sheet 1 of 2    5,026,089
FIG. 1
FIG. 2
FIG. 3
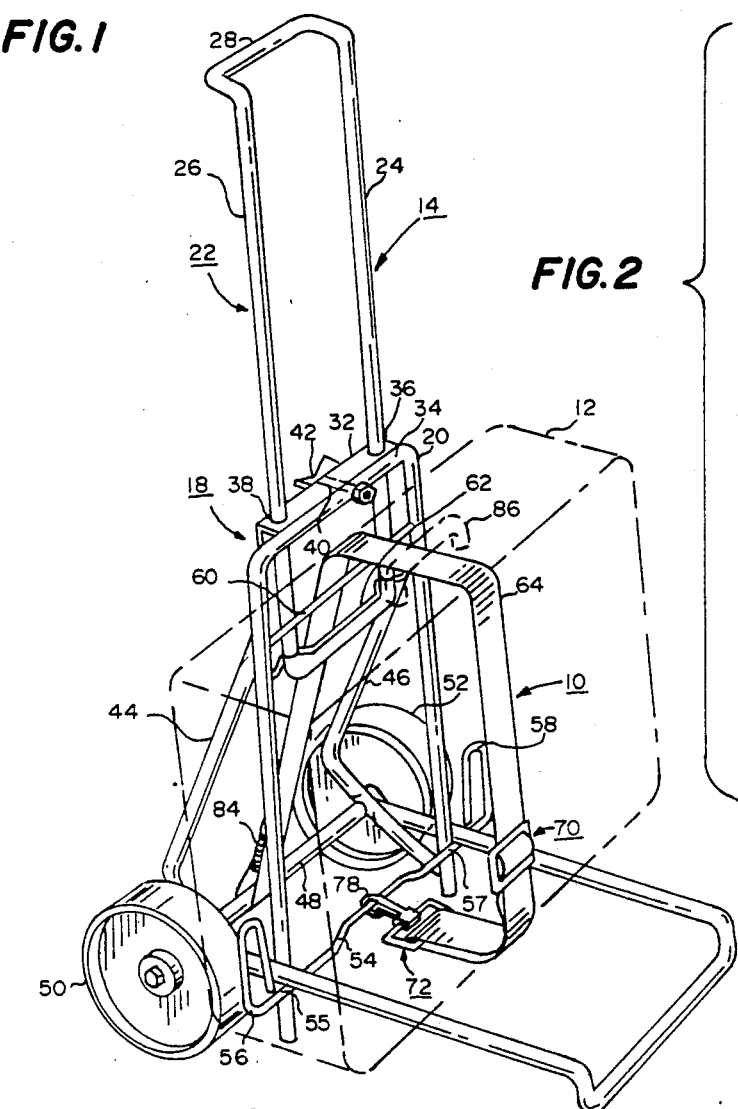
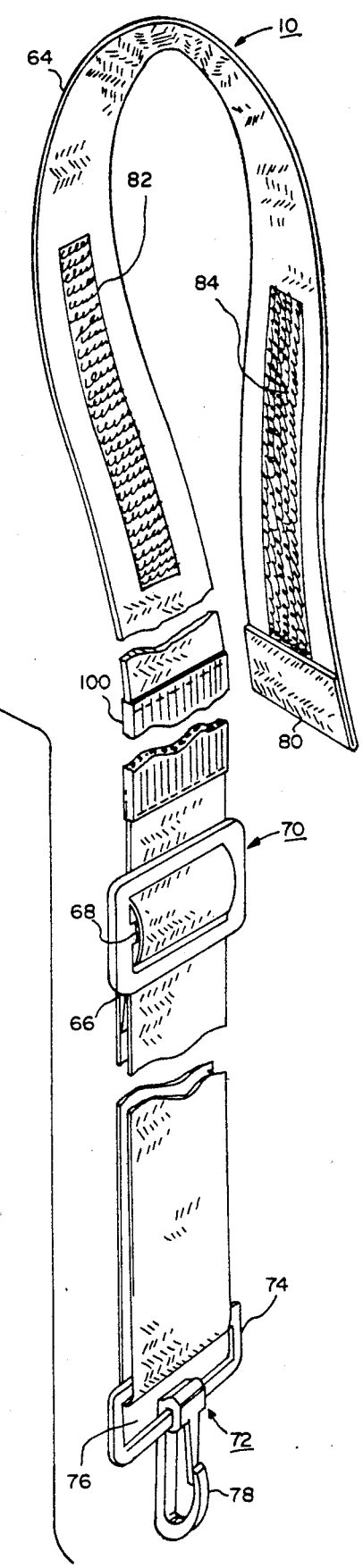
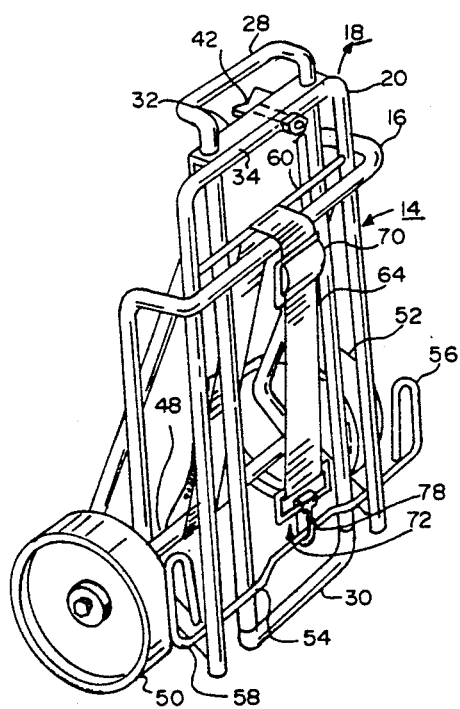

LUGGAGE SECURING STRAP FOR USE WITH COLLAPSIBLE LUGGAGE CARRIER

BACKGROUND OF THE INVENTION

1. Field of the Invention

This invention relates to an improved strap for use in securing one or more items of luggage to a collapsible luggage carrier, and to a method for using the improved strap.

2. Background Information

Collapsible luggage carriers are frequently used by travelers, particularly those using air transportation. The collapsible luggage carts are used to carry luggage during that portion of a trip which must be made by foot. Such as, between ground transportation and an airline baggage check-in station, or between a hotel room and the point of access to ground transportation. There are many types of collapsible luggage carriers in use. While by no means an exhaustive presentation of the varieties of such carts, the following United States patents are representative:

| U.S. PAT. NO. | INVENTOR | ISSUE DATE |
| --- | --- | --- |
| 3,892,429 | Dalmy | 7/01/75 |
| 3,947,054 | Hall | 3/30/76 |
| 3,998,476 | Kazmark | 12/21/76 |
| 4,175,769 | Kazmark | 11/27/79 |
| 4,221,402 | Kazmark | 9/09/80 |
| 4,401,319 | Kazmark | 8/30/83 |
| 4,431,211 | Carrigan | 2/14/84 |
| 4,506,897 | Libit | 3/26/85 |
| 4,546,995 | Kasomi | 10/15/85 |
| 4,630,837 | Kazmark | 12/23/86 |

Carts, such as are represented by those illustrated in the above-mentioned patents, unfold and extend to provide a luggage carrying platform and a handle extending at generally right angles to the platform. A pair of wheels are provided on an axle which is located at or near where the handle and carrying platform are connected together. In the past, luggage has been held on such carriers by a strap secured at one end, such as around the axle or a cross member which is generally parallel to the axle and located where the handle and platform are connected, and wrapped around the handle at the other end, with a buckle being used to adjust the length of the strap, such as is shown in the above-mentioned U.S. Pat. No. 3,947,054.

Another way of securing luggage on a cart, and perhaps that most frequently employed, involves the use of elastic cords which have hooks on both ends. Such straps are, for instance, shown in the above-mentioned U.S. Pat. Nos. 4,175,769; 4,221,402; 4,401,319; 4,506,897. However, there are several disadvantages to the use of such elastic cords, commonly called "Bungie Cords".

Perhaps, one of the more serious disadvantages of using such elastic cords is that when the cords are extended to near their maximum extent, such as when securing or removing luggage from a cart, should one lose their grip on the cord, the loose hook can become a somewhat lethal instrument as it is rapidly retracted toward the fixed end.

Another disadvantage is that the force required to stretch the cord sufficiently to secure luggage, may be considerably more force then some people are comfortable in exerting.

Still another disadvantage is that the tensile force required to adequately secure the luggage, may in the case of soft luggage be sufficient to deform the luggage during the time that it is strapped to the cart, thereby putting undesirable wrinkles or creases in the clothing which is packed within the luggage.

Finally, should a traveler use or carry the same items of luggage day after day, the cords will eventually lose their elasticity and a different manner of attachment, which further stretches the cord, will become necessary and may perhaps be inconvenient.

SUMMARY OF THE INVENTION

Accordingly, it is an object of this invention to provide a strap for use with collapsible luggage carts which eliminates the disadvantages related to the use of elastic cords and ordinary straps with buckles. It is further an object of this invention to provide a strap which may be readily adjusted for use in carrying one or more different pieces of luggage on the cart. It is a still further object of the invention to provide a strap which when adjusted for use with one or more regularly carried pieces of luggage, may be repeatedly used to secure those pieces of luggage without any readjustment of the length of the strap or the locations at which the ends of the strap are secured on the cart.

In accordance with this invention, a strap formed of a web material has one end secured to a buckle, and a hook and loop material is applied to two spaced portions of the strap near its opposite end. A snap or hook-type fastener is provided with a slot for receiving the strap. The fastener is secured to the trap by passing the strap through the slot. After the strap is passed through the slot, the strap is looped through the buckle in the normal manner such that the fastener is located on a loop of the strap formed between the end of the strap connected to the buckle and the portion of the strap engaged in the buckle. The strap is used to secure luggage to a cart by engaging the hook or snap on a first cart member, typically the axle or another cross-member generally parallel to and near the axle, passing the strap over the luggage, wrapping the strap around another cart member, pulling the strap tight, and then bringing the portions of hook and loop material into engagement to secure the end of the strap. The buckle is provided to adjust the strap to the approximate length required for securing the luggage to the cart. The elongated portions of the hook and loop material are of sufficient length, such that final adjustment of the length of the strap can be made by adjusting the amount of overlap between the portions of hook and loop material. To provide additional tension in the strap, the web material forming the strap may be separated into two portions, with a short length of an elastic strap secured between the two portions.

BRIEF DESCRIPTION OF THE DRAWINGS

FIG. 1 is a perspective view of a collapsible luggage cart with a luggage strap, formed in accordance with this invention, securing a piece of luggage to the cart;

FIG. 2 is a perspective view of a preferred form of the luggage strap of this invention;

FIG. 3 is a perspective view of the luggage cart shown in FIG. 1, folded, collapsed, and secured for carrying without luggage mounted thereon, by the luggage strap of this invention.

DETAILED DESCRIPTION OF THE PREFERRED EMBODIMENT

Figure 4:
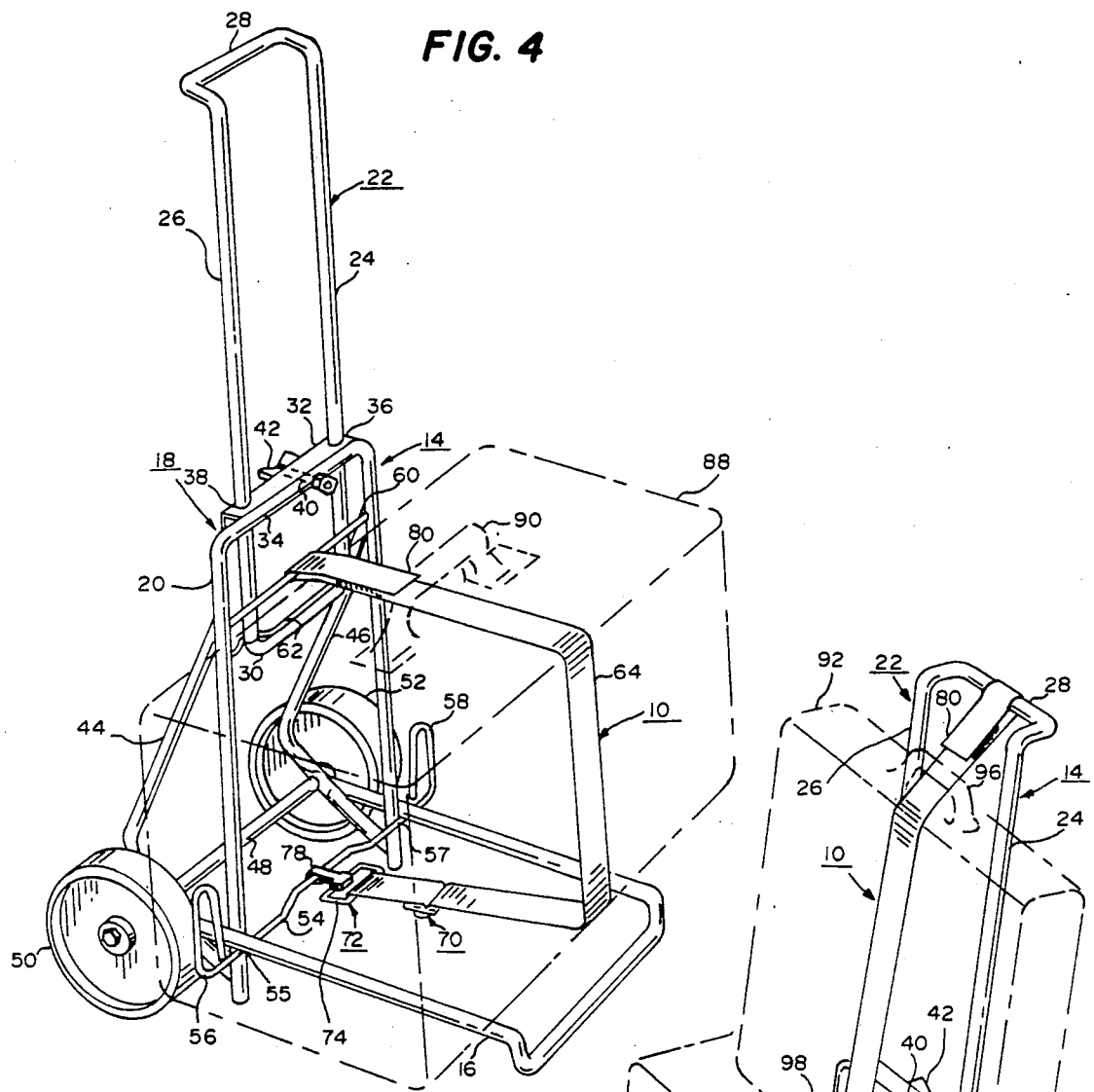
FIG. 4 is a perspective view of the luggage cart shown in FIG. 1, with the luggage strap of this invention adjusted to secure a piece of luggage having a different cross-sectional shape than the piece of luggage shown in FIG. 1.

Referring to FIG. 1 of the drawings, a luggage strap 10, formed in accordance with this invention, is shown securing a piece of luggage 12, shown by phantom lines, to a collapsible luggage cart 14. The luggage cart 14 includes a luggage supporting portion 16 and a handle assembly 18. The handle assembly 18 includes a U-shaped member 20 and a handle extension 22, both being formed of lightweight tubular material. The handle extension 22, which is in the form of a rectangular member, has two elongated side members 24 and 26, which are connected at the top by a handle 28 and at the bottom by a cross-member 30. A bracket 32 secured to base portion 34 of the U-shaped member 20 is provided with holes 36 and 38 therein which receive elongated side members 24 and 26 of the handle extension 22. The bottom cross-member 30 is permanently secured to the side members 24 and 26 after they are passed through the holes 36 and 38. A bolt 40 passes freely through a hole formed in the center of the base portion 34 of the U-shaped member 20, and a hole formed in the bracket 32 to provide a means for securing the handle extension 22 at the desired height with respect to the U-shaped member 20. An easily grasped knob 42 is threaded onto bolt 42. The holes 36 and 38 in the bracket 32 are of a larger diameter than the elongated side members 24 and 26, such that when the knob 42 and the bolt 40 are tightened, the bracket 32 is pulled toward the base portion 34 of the U-shaped member 20 to secure the handle extension 22 in the desired position, which may be either fully retracted, fully extended, or some intermediate position which is comfortable to the user of the cart.

The cart also includes a pair of L-shaped members 44 and 46 which are secured at both ends to the legs of the U-shaped member 20, such as by welding. Holes are provided in the L-shaped members 44 and 46 for receiving an axle 48 upon which are mounted wheels 50 and 52. Additional rigidity is provided to the cart by solid rod members, one of which 54 extends across the cart and is secured to the U-shaped member 20 at locations 55 and 57. Loops 56 and 58 are provided at the end of rod 54 to prevent the wheels 50 and 52 from rubbing the luggage carried on the cart. A pair of rods 60 and 62 are secured between the legs of the U-shaped member 20, near the base portion 34, with one of them being deformed, such that the elongated side members 24 and 26 of the handle extension 22 are trapped therebetween. They, in conjunction with the bracket 32 hold the handle extension 22 in an upright position with respect to the U-shaped member 20.

Referring now to FIG. 2, the strap of this invention will be described. The strap 10 is formed of a flat web material 64. The web material 64 is of sufficient strength to secure the luggage, and is of sufficient width so as not to as readily press into the luggage as would a narrow or cylindrical strap. A first end 66 of the web 64 is secured to a center cross member 68 of a length adjusting buckle 70 by sewing, riveting, clamping or other suitable means. A fastener 72 which is preferably formed of plastic includes a loop portion 74, forming a slot 76, and a hook 78. The other or second end 80 of the web 64 is passed through slot 76 of the fastener 72 and is then threaded through the buckle 70. The position of the web within the buckle 70 determines the overall effective length of the strap.

Spaced elongated segments 82 and 84 of a mutually engageable fastening material, such as "hook-and-eye" material, are secured to one side of the web 64 near the other end 80. A well known brand name for such mutually engageable material is "Velcro". The portions 82 and 84 are longer than necessary to provide adequate securing force when completely engaged with each other, since when in use only portions of segments 82 and 84 may be in engagement with each other.

Referring now to FIG. 1, the manner of utilizing the strap illustrated in FIG. 2 will be described. With the article of luggage of 12 placed on the cart, the end of the luggage strap with the "hook-and-eye" segments is wrapped around the axle 48 and the "hook-and-eye" segments 82 and 84 are brought into full engagement with each other. That is, with the full lengths of the segments being in engagement with each other. The strap is then brought up over the rod 60, through handle 86 of the piece of luggage 12, around and under the piece of luggage 12, where the hook 78 is engaged on the rod 54. To engage the hook 78 on the rod 54, the cart is most conveniently pivoted to rest on its wheels 50 and 52 and its handle 28. Utilizing the buckle 70 in a normal manner, the length of the strap is adjusted to snugly engage the periphery of the piece of luggage 12. After this preliminary adjustment in the length of the luggage strap 10 has been made, the "hook-and-eye" segments 82 and 84 may be disengaged from each other, the end 80 of the strap pulled snugly around the axle and the "hook-and-eye" segments 82 and 84 re-engaged to more tightly secure the strap around the piece of luggage 12. As was previously mentioned, when the strap is tightened in this way, the full length of "hook-and-eye" segments 82 and 84 may not be, and most likely will not be fully engaged with each other, but rather, will be off-set by the amount of slack taken up by the tightening the strap about the piece of luggage 12.

Referring now to FIG. 3, when the luggage has been removed from the cart by disengaging the "hook-and-eye" segments 82 and 84, the cart may be collapsed by loosening the knob 42 and pushing the handle extension 22 toward the luggage supporting portion 16, and then pivoting the luggage supporting member 16 toward the U-shaped member 20. The strap is then repositioned around members of the cart, so that when the "hook-and-eye" segments 82 and 84 are re-engaged with each other, the strap will secure the cart in a storage configuration, as shown in FIG. 3.

Once the strap is adjusted as described with respect to FIG. 1, no further adjustment of the strap will be necessary when transporting the piece of luggage 12. Thus, the same piece of luggage may be quickly secured to and removed from the cart without further adjustment of the length of the strap 10 by buckle 70.

Figure 5:
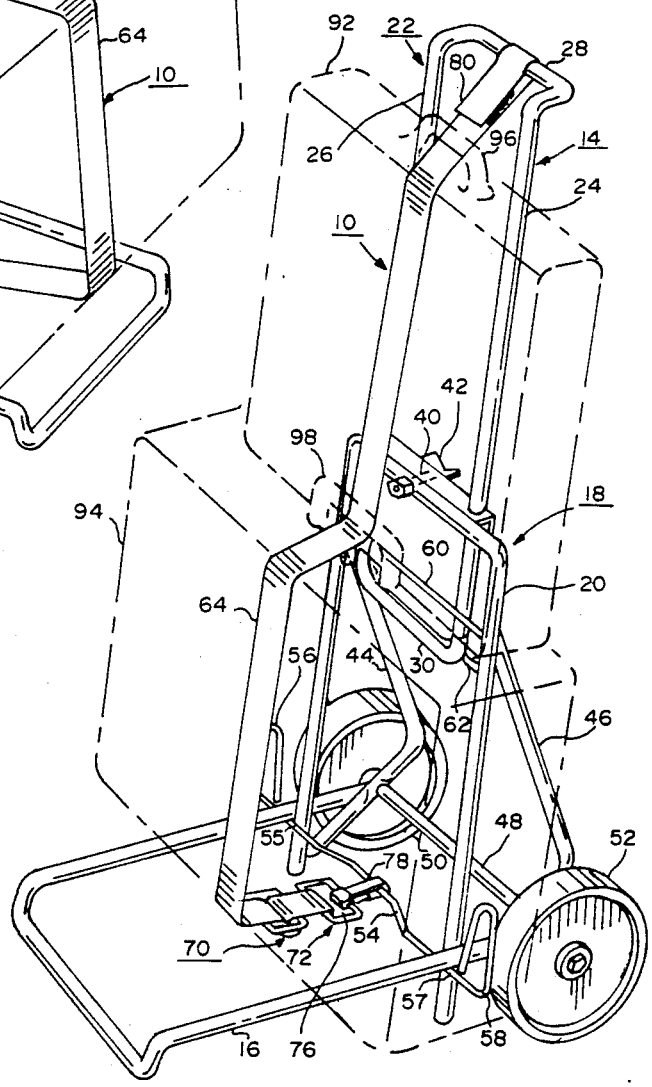
FIG. 5 is a perspective view of the luggage cart shown in FIG. 1, with the luggage strap of this invention adjusted to secure two pieces of luggage to the luggage cart.

Referring to FIG. 4 and 5, the manner in which the luggage strap 10 of this invention may be readily used with pieces of luggage of different sizes and configurations will be described. With a piece of luggage 88 having a different profile, i.e. of lesser height but greater width, as shown in FIG. 4, it may be desirable to secure the end 80 of the strap to a different portion of the cart with the "hook-and-eye" segments 82 and 84. The end 80 of the strap 10 is looped around and secured to the rod 60, and the strap is then passed through a handle 90 of piece of luggage 88, and the hook 78 is engaged with rod 54. The buckle 70 is adjusted to make the strap 10 as snug as possible around the piece of luggage 88. As discussed with respect to FIG. 1, the "hook-and-eye" segments 82 and 84 are again disengaged, the end 80 of the strap pulled tight, and the "hook-and-eye" segments 82 and 84 are again engaged to secure the piece of luggage 88 to the cart.

Referring now to FIG. 5, the luggage strap 10 of this invention is shown used to secure two pieces of luggage 92 and 94 to a cart. The two pieces of luggage 92 and 94 are again shown by phantom lines, such that the connections of the strap to the cart will be readily seen. It being desirable in this case to have the thinner piece of luggage 92 placed on top of the larger and thicker piece of luggage 94, the end 80 of the strap is secured around the handle 28. The end 66 of the strap and the buckle 70 are passed through handle 96 of the piece of luggage 92 and through handle 98 of the piece of luggage 94. The length of the strap is preliminarily adjusted by the use of the buckle 70, and then hook 78 is engaged on the rod 54. As previously described, the "hook-and-eye" segments 82 and 84 are again disengaged, the strap pulled tight, and the "hook-and-eye" segments 82 and 84 reengaged to secure the pieces of luggage and 92 and 94 to the cart.

After a user has become familiar with the use of the improved luggage strap of this invention, it may become possible to closely estimate the approximate effective length of the strap required to secure a particular piece or pieces of luggage. If that is possible, it may be more convenient to merely engage the hook 78 on a cross-member of the cart, adjust the effective length of the strap with the buckle 70, pass the other end of the strap around the luggage and another cross-member of the cart, and then engage the "hook-and-eye" segments after pulling the strap snugly around the luggage.

While a feature of the luggage strap of this invention is the elimination of the use of a strap, the full length of which is elastic, a limited amount of elasticity may at times be found desirable. In such cases, a short segment of elastic material, such as shown at 100 in FIG. 2, may be provided in the luggage strap of this invention. However, it has been found that the luggage may be securely retained on the cart without the provision of such an elastic segment.

It should be apparent to those skilled in the art, that while what has been described is considered at present to be a preferred embodiment of the luggage strap of this invention, in accordance with the patent statutes, changes may be made in the luggage strap without actually departing from the true spirit and scope of this invention.

The appended claims are intended to cover all such changes and modifications which fall within the true spirit and scope of this invention.

I claim:

1. A luggage securing strap for use with a wheeled luggage cart having a luggage supporting platform, a handle extending from the luggage support platform, an axle having wheels thereon for supporting the cart, and the luggage supporting platform and the handle including cross-members which extend generally parallel to the axle, said securing strap comprising:

a flat elongated strap having first and second ends, a buckle, said buckle being secured to said first end of said strap, a pair of elongated segments of mutually engageable fastening material, said pair of elongated segments of mutually engageable fastening material being secured in a spaced apart relationship to one side of said strap adjacent the second end of said strap, a fastener, said fastener including a loop portion forming a slot, and a hook, said second end of said strap passing through said slot in said loop portion, and then through said buckle, with a portion of said strap intermediate said first end and said pair of elongated segments of mutually engageable fastening material being engaged in said buckle, said fastener being located on a loop of said strap formed between said first end of said strap and said portion of said strap engaged in said buckle, whereby said second end of said strap may be looped around a member of the luggage cart, and said pair of elongated segments of mutually engageable fastening material engaged with each other, said strap then being wrapped around the luggage on the cart, and said hook engaged with another member of the cart, said buckle then being adjusted to tighten said strap around the luggage, thereafter said pair of elongated segments of mutually engageable fastening material may be disengaged, and said strap pulled tightly around the first member of the cart and the pair of elongated segments of mutually engageable fastening material re-engaged to secure the luggage to the cart.

2. The luggage securing strap of claim 1, wherein the pair of elongated segments of mutually engageable fastening material are of the hook-and-eye type.

3. The luggage securing strap of claim 1, wherein said fastener is formed of plastic.

4. The luggage securing strap of claim 1, wherein said buckle is formed of plastic.

* * * * *